Dec. 11, 1956 R. J. WILLIAMS ET AL 2,773,636
PAPER OR LIKE CONTAINERS AND THEIR MANUFACTURE
Filed Aug. 11, 1952 5 Sheets-Sheet 1
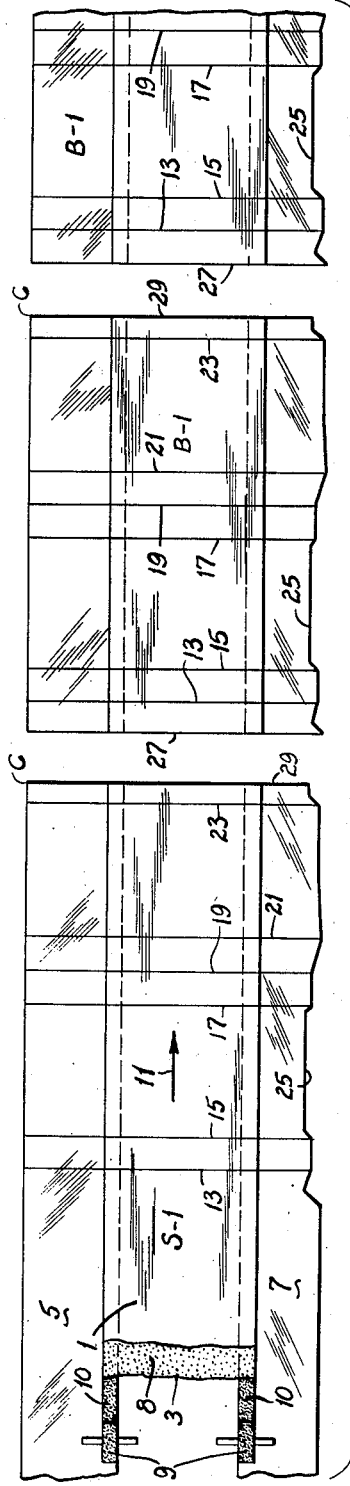
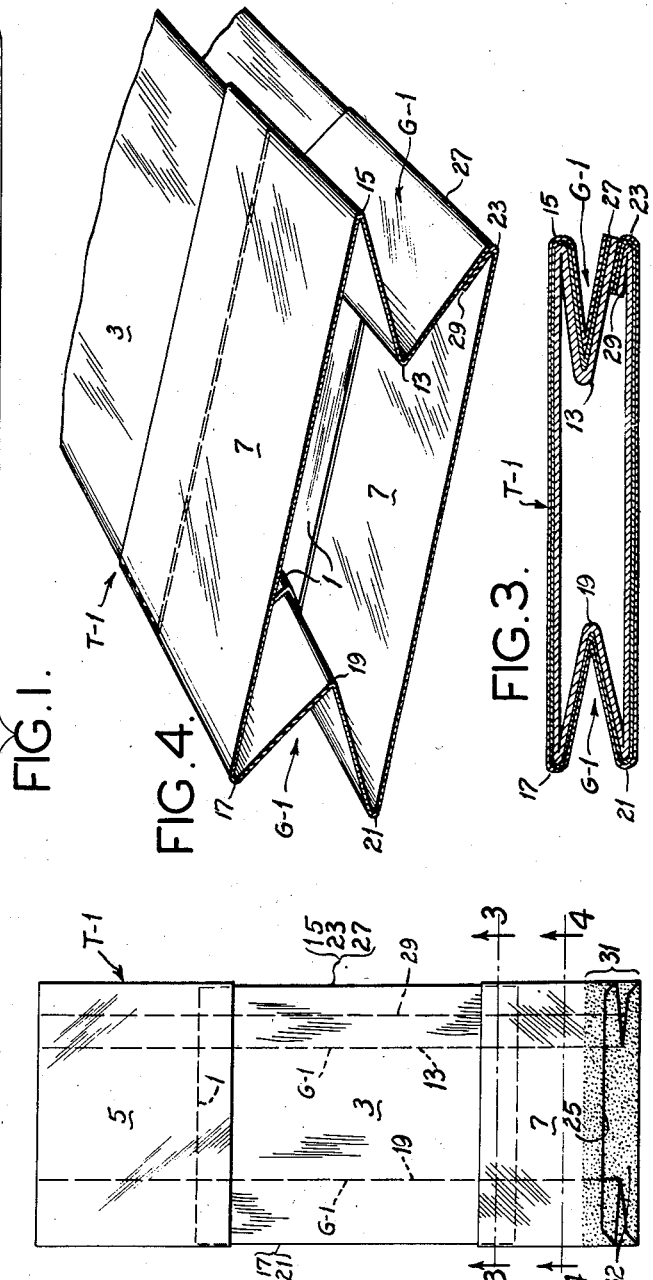

Dec. 11, 1956  R. J. WILLIAMS ET AL  2,773,636
PAPER OR LIKE CONTAINERS AND THEIR MANUFACTURE
Filed Aug. 11, 1952  5 Sheets-Sheet 2

Russell J. Williams,
Charles V. Brady,
Inventors.
Koenig and Pope,
Attorneys.

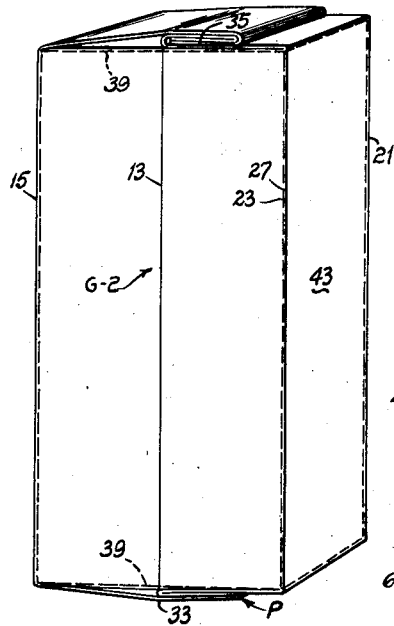
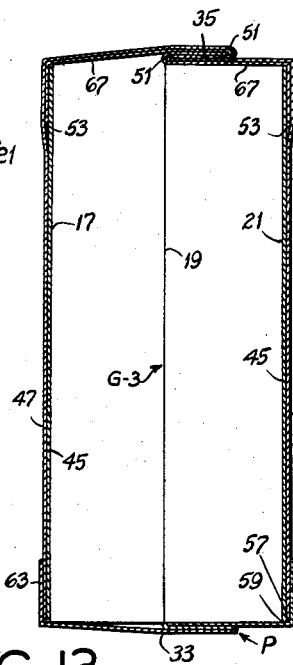
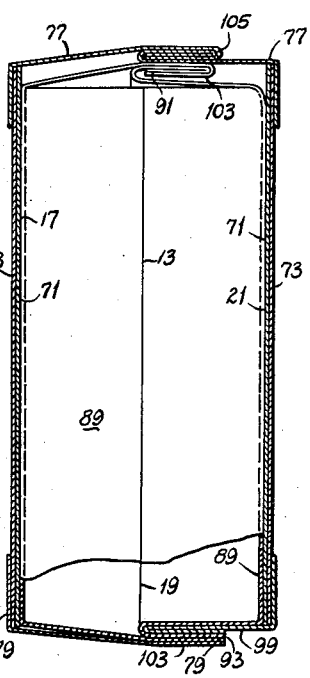
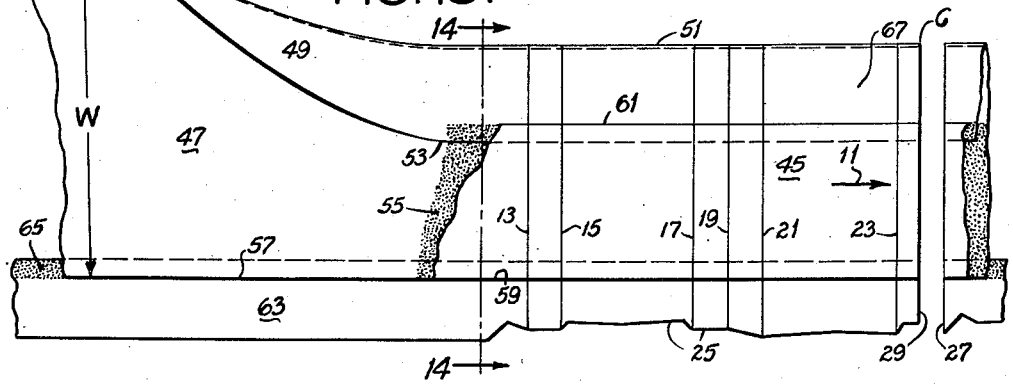
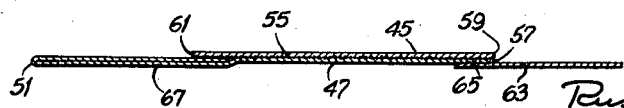

Dec. 11, 1956  R. J. WILLIAMS ET AL  2,773,636
PAPER OR LIKE CONTAINERS AND THEIR MANUFACTURE
Filed Aug. 11, 1952  5 Sheets-Sheet 4

Russell J. Williams,
Charles V. Brady,
Inventors.
Koenig and Pope,
Attorneys.

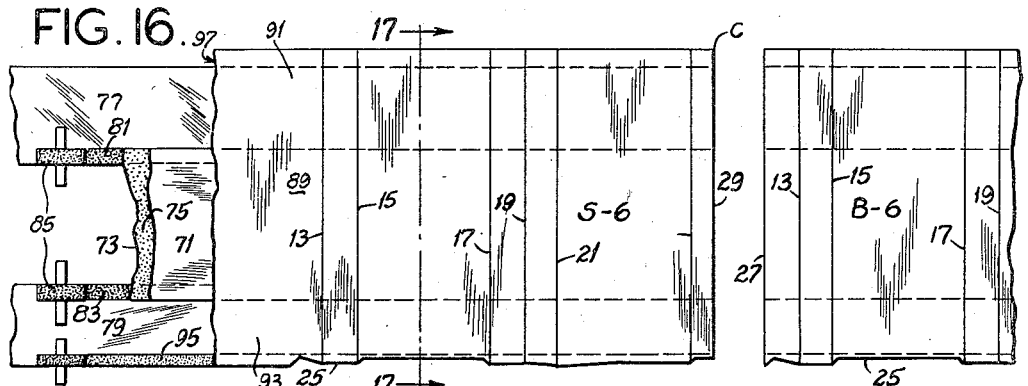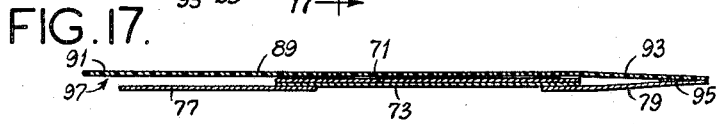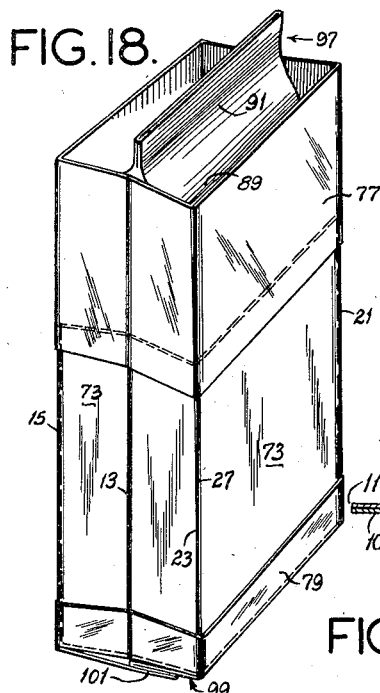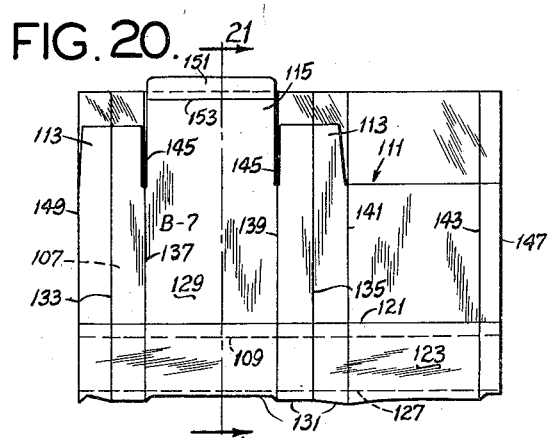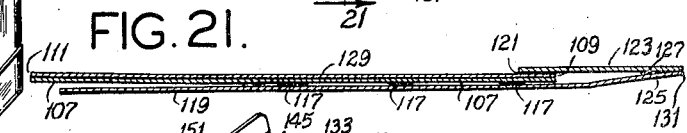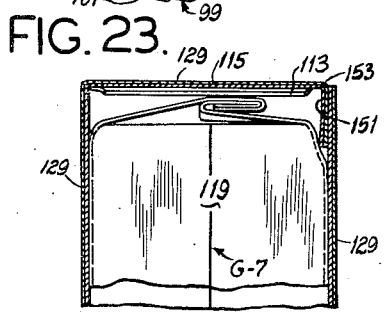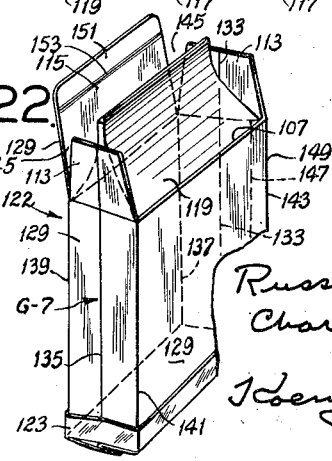

United States Patent Office 2,773,636
Patented Dec. 11, 1956

2,773,636

PAPER OR LIKE CONTAINERS AND THEIR MANUFACTURE

Russell J. Williams, Richmond Heights, and Charles V. Brady, St. Louis, Mo., assignors to Bemis Bro. Bag Company, St. Louis, Mo., a corporation of Missouri Application August 11, 1952, Serial No. 303,772

5 Claims. (Cl. 229—55)

This invention relates generally to paper or like containers and their manufacture, and more particularly to carton-type bags which may be shipped flat.

Among the several objects of the invention may be noted the provision of a container which partakes of the advantages of a relatively stiff carton construction and also partakes of the advantages of a bag; the provision of an article of the class described which may be made up (whether lined or unlined) with a closed bottom and an open top and shipped flat for subsequent extension and filling; the provision of an article of this class which may be manufactured from supply strips of paper and cardboard or the like, and made up with a closed bottom on machinery of the bag-making type, rather than made up from flat stock on forms such as are sometimes associated with filling spouts, thus disassociating the bag manufacturing operation from the filling operation; and the provision of an article of the class described which is conservative of the material required for its manufacture. Other objects will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is a diagrammatic plan view illustrating initial blank-making steps for producing an article according to one form of the invention;

Fig. 2 is a plan view illustrating a step subsequent to that of Fig. 1 and showing a flat tubular blank with an open bottom and top;

Fig. 3 is an enlarged diagrammatic cross section taken on line 3—3 of Fig. 2 but showing the tubular blank parts partially separated;

Fig. 4 is a perspective view taken on line 4—4 of Fig. 2 but showing the blank parts again partially separated;

Fig. 12 is a perspective view of a filled and closed bag made according to the second form of the invention;

Fig. 13 is a view similar to Fig. 1, showing preliminary steps for making a third form of the invention;

Fig. 14 is an enlarged cross section taken on line 14—14 of Fig. 13;

Fig. 15 is a cross section of an opened and filled bag in the third form of the invention;

Fig. 16 is a view similar to Fig. 1, showing a blank-producing step for a sixth form of the invention;

Fig. 17 is an enlarged cross section taken on line 17—17 of Fig. 16;

Fig. 18 is a perspective view showing an expanded and filled bag of the sixth form ready for closure;

Fig. 19 is a cross section of the sixth form of bag, completely closed;

Fig. 20 is a plan view of a blank for forming a seventh form of the invention;

Fig. 21 is an enlarged cross section taken on line 21—21 of Fig. 20;

Fig. 22 is a view similar to Fig. 18 but showing said seventh form of the invention; and, Fig. 23 is a fragmentary enlarged cross section showing a final closure for said seventh form.

Corresponding reference characters indicate corresponding parts throughout the several views of the drawings.

Figure 5:
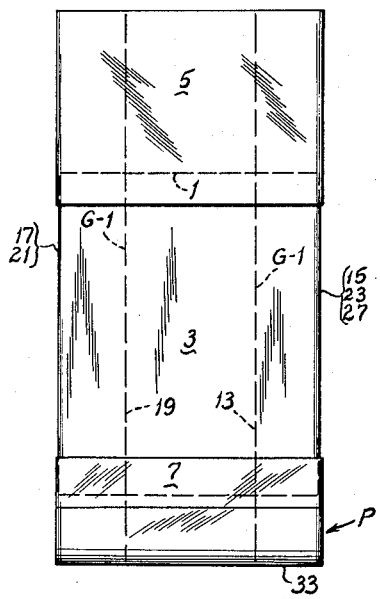
Fig. 5 is a view similar to Fig. 2, showing a final flat bag with closed bottom made according to the first form of the invention and ready for shipment.

Hereinafter the term "chip board" is referred to as the preferable material from which certain reinforced portions of the bags are made; but it is to be understood that this particular material is only exemplary of any cardboard material, or material in the nature of cardboard, which may be kept in and supplied from rolls, but which will maintain itself substantially flat when unrolled and which may be scored for hinging.

The term "two-way score" means that a score is so made that one panel part will hinge to one side or another of an adjacent panel part to which it is joined. By "one-way score" is meant one for which the score is made so that angling of one panel with respect to another is substantially confined to one direction.

The term "paper" is used for any relatively flexible sheet. Reference to the paper being of certain pound weights such as 30 pounds, 65 pounds, etc., means, for example, 30 pounds, 65 pounds, etc. per ream (five hundred 24 x 36 inch sheets).

It will be understood that there are other material equivalents of paper which may be used for the purposes herein described such as plastics, cloth, and open mesh woven materials. It is to be understood that the term "paper" is used herein to define any such materials.

Briefly, the invention consists in the provision of a carton-type bag which may be made from continuous adhesively assembled chip board and paper (or like) strips, the assembled strips being longitudinally trimmed, and laterally scored and segmented for subsequent folding and pasting into flat tubular blanks. In general, the chip board strip is mainly in a girthwise mid portion of the tubular blank, leaving paper end extensions or cuffs for closure-forming purposes. The scoring is such that one-way inwardly hinging gussets are provided which run through the intermediate chip board portions and the end-closure cuff portions of the blanks. The result is that the all-paper bottom portions may be preclosed and the bags shipped flat to a filling point. Moreover, preparatory to filling, the sides may be opened out into a carton-like form, although the bottom has been preclosed, leaving paper-top closure portions adapted to be closed after filling. The result is a readily manufactured closed-bottom, open-top carton-type bag which may be shipped flat and readily opened out for filling and then after filling readily closed at the top to provide a neat package having clearly defined right-angular edges and corners such as provided by cartons. As to the paper arrangement, it is in general such that lighter weights are used to provide outside printing surfaces attached to the chip board areas, and heavier weights (or their equivalents) of paper extensions in the bottom and top areas to provide for strength in closures which are made therefrom. In some forms of the invention a protective liner is incorporated.

Referring now more particularly to Fig. 1, there is shown at numeral 1 a continuous chip board strip to which is adhered a facing 3 of, say, 30-pound smooth-finish paper. This paper in the final package forms an outside printing surface on the chip board. The strips 1, 3 may be withdrawn from individual supply rolls (not shown) and adhered as by adhesive 8, or 1 and 3 may have been preassembled and stored in a roll. At 5 and 7 are shown top and bottom cuff-forming paper strips, say, of 65-pound weight each. These are also drawn from supply rolls not shown. By suitable means 9 these strips 5 and 7 are provided with marginal adhesive 10 adhered to the assembly 1, 3, adherence being effected on the paper facing 3 of the chip board strip 1. The assembly is provided with lateral folding scores 13 and 19 of the single-hinge type, and scores 15, 17, 21 and 23, preferably of the double-hinge type. At numeral 25 is shown a zig zag bottom trimming cut which, like the scores, may be made before or after a later segmentation step. The drawing illustrates the former case.

The assembled strip (which in general we label S–1) proceeds as shown by arrow 11 and is segmented along lines such as shown at C to provide flat blanks such as shown at B–1, having edges 27 and 29. Each blank is then folded into what may be referred to as a flat tube, illustrated in Figs. 2–4 and in general indexed T–1. The folding is done with the chip board strip 1 inside, the label strip 3 and the closure strips 5 and 7 on the outside. The edge 27 is brought into alignment with score 23 and the adjacent margins are adhered. The manipulation during folding is such as to provide inwardly directed gussets G–1. The result is the flat tube T–1 (Fig. 2) having a central band of relatively stiff reinforcing material and the cuff-forming paper end bands 5 and 7. The cut 25, which was zig zag in Fig. 1, results in the shingled area 31 shown at the lower end of Fig. 2. To this area adhesive 32 is applied. The area is then folded up on fold line 33 (Fig. 5) to form what is known as a pinch bottom, as indicated at P in Fig. 5.

Figure 6:
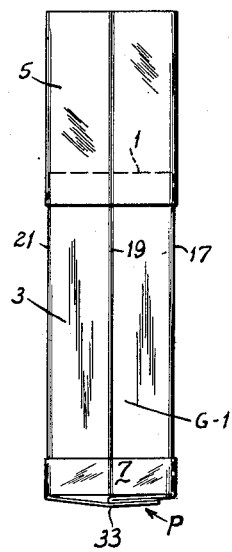
Fig. 6 is a side elevation of an opened bag of the first form ready for filling.
Figure 7:
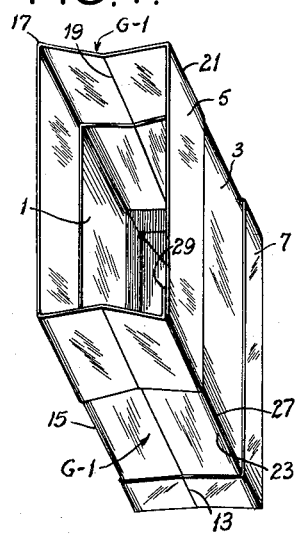
Fig. 7 is a perspective view from the top of Fig. 6, looking into the open mouth of the bag of Fig. 5, ready for filling.

The purpose of the shingling brought about by the cut 25 is to ensure that all lower margins that are folded up will be adhered by 32 to the area over which they are folded. It is to be understood that this pinch bottom is only one type of known bottom that may be made in connection with a gusseted tube such as T–1 and is shown only by way of example. An important feature in connection with the paper bottom and the gusseted arrangement is that the bottom is free of the chip board and may be readily preclosed so that the bag may be shipped flat. But upon opening the bag by expanding the side gussets G–1, the strong paper bottom, which is flexible, is held in a flat position such as shown at the bottom of Figs. 6 and 7. The top is also held widely open for convenient filling. Since the middle folds of the gussets G–1 are made from the single-hinge scores 13 and 19, the sides of the resulting open bag tend to assume a flat arrangement without bulging, as also is the case with the front and back (note Figs. 6 and 7).

Figure 8:
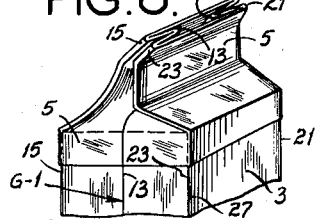
Fig. 8 is a fragmentary perspective view showing a closing step which may be used for closing the bag of the first form of the invention.
Figure 9:
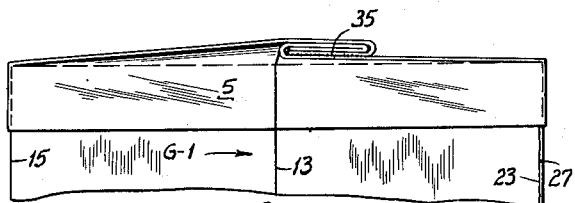
Fig. 9 is a fragmentary and enlarged side elevation showing a final closed condition of a bag made according to the first form of the invention.

After filling, the top extension made by the closure strip 5 may be folded shut, as indicated in Figs. 8 and 9, and pasted down by adhesive 35 (Fig. 9). Figs. 8 and 9 show what may be referred to as a folded or pinch type of top closure, but it is to be understood that other closure folding methods may also be used for the purpose. The result, when filled, is a neatly formed and strong carton-like container which, however, up to the time that it was expanded for filling partook of the nature of a bag adapted to be shipped flat.

From the above description of the first form of the invention shown in Figs. 1–9, it will be seen that the three bands of paper 3, 5 and 7 in effect provide an outer paper bag having an attached inside girthwise chip board reinforcement to give it the properties of a carton when filled and closed. The 65-pound weight of the paper in the end closures provides strength in the closed ends more or less matching the strength in the front, back and sides provided by the chip board and adhered 30-pound strip 3.

Figure 10:
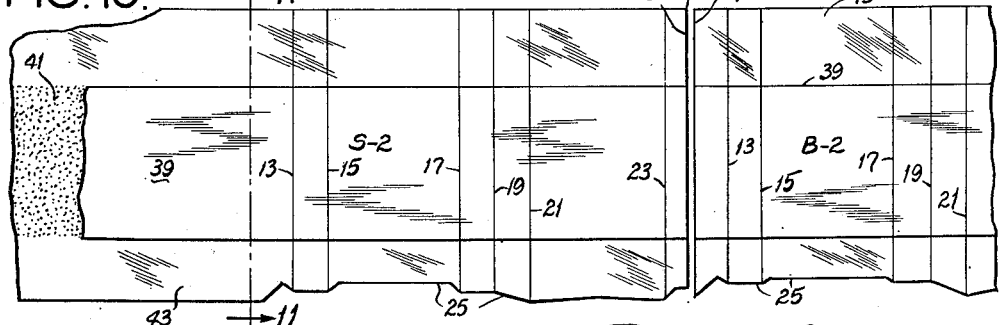
Fig. 10 is a view similar to Fig. 1 but relating to a second form of the invention.
Figure 11:
Fig. 11 is an enlarged cross section taken on line 11—11 of Fig. 10.

Referring now to Figs. 10–12, which show a second form of the invention, numeral 39 indicates a chip board strip which by means of paste or adhesive 41 is adhered centrally to a broad strip 43 of, say, 65-pound paper. The scoring, cutting and segmenting are as already described in connection with Figs. 1–9, the same reference numerals being used for such scoring, cutting and segmenting. Numeral S–2 indicates the advancing assembled strip before segmenting, and B–2 indicates part of a segmented blank ready for folding. It will be unnecessary again to describe the folding and bottoming steps to form a tubular blank, because this will be clear from what has already been said in connection with the first form of the invention. The final form of the package in this case (as filled and closed) is shown in Fig. 12, wherein the expanded side gussets are shown at G–2. The package of Fig. 12 differs from that shown in Figs. 8 and 9 in that a continuous sheet of 65-pound paper forms the outer printing layer on the chip board band 39 and also the bottom and top closure extensions. To the extent that the paper is of heavier weight in the printing area, the production cost of this form of the invention is somewhat greater than that of the form described in connection with Figs. 1–9, but in some cases this is warranted.

Referring to Figs. 13, 14 and 15, there is shown a third form of the invention in which the chip board strip is shown at 45. At numeral 47 is shown a paper strip of, say, 30-pound weight, which is of an original width W sufficient for inturning it, as indicated at 49, to provide a marginal crease 51 and an inturned margin 53. The inturning as shown at 49 may be accomplished on a paper tuber or folder. The chip board strip is attached to the paper strip 47 by means of adhesive or paste such as shown at 55. This places the unfolded margin 57 of the strip 47 adjacent one margin 59 of the chip board strip 45. The other margin 61 of the chip board strip laps the inturned margin 53 of the paper strip 47.

Next a 65-pound (for example) strip of paper 63 is adhered to the margin 57 of the combination of strips 47 and 45, adhesive for the purpose being shown at 65. The resulting assembly is shown in cross section in Fig. 14, wherein it will be apparent that the chip board strip 45 has received a printing surface in the form of a 30-pound layer of paper, with the 65-pound paper marginal extension 63 providing bottom-forming material and a multi-ply marginal strip 67 providing top-forming material. Since each ply in strip 67 is of 30-pound weight, the sum of the two in the top-forming material is approximately the equivalent of the 65-pound weight paper in strip 63. It will be understood that the assembled strips of Figs. 13 and 14 are cut, scored and segmented as already described, the same numerals for these scores, cuts and segmentations being used in the form of the invention shown in Figs. 13, 14 and 15 as in Figs. 1–12. Folding, edge pasting and bottom formation are then proceeded with, as already described, with the result that a carton is produced which when filled is as shown in cross section in Fig. 15. It will be understood that the package shown in Fig. 15 may be considered to be filled, although its contents are not indicated. The result is a package with chip board front, back and sides having a 30-pound paper printing surface, with heavier-weight paper bottom and top closures. The gussets G–3 serve the purposes already described.

Figure 13A:
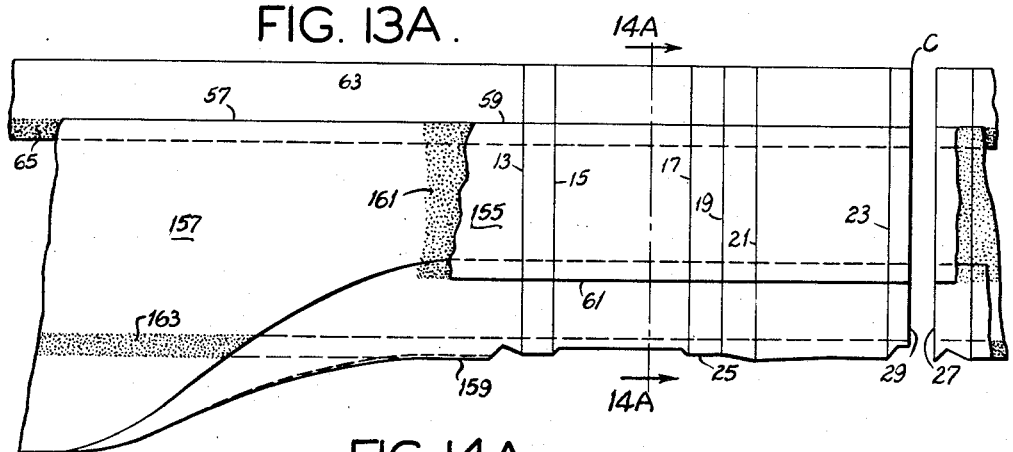
Fig. 13A is a view similar to Fig. 13, but showing a fourth form of the invention which is alternative to the third form.
Figure 14A:
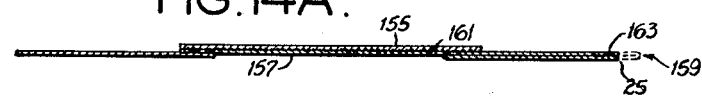
Fig. 14A is a cross section taken on line 14A—14A of Fig. 13A.

In the form of the invention shown in Figs. 13, 14 and 15, the arrangement of the paper strips 47 and 63 can be reversed, in the sense that the multi-ply extension formed by the folded material of strip 47 can form the bottom, and the material of strip 63 form the top. This may be referred to as a fourth form of the invention and is illustrated in Figs. 13A and 14A. In this case the chip board strip is shown at numeral 155 and the paper strip at 157, turned down and folded at 159 for attachment to strip 155 by adhesive 161. In this case a strip of adhesive 163 is employed within the fold 159, so that when the cut 25 is made, loose multi-ply edges will not appear in the resulting folded and pasted bottom. In Fig. 14A is shown by dotted lines how a portion of the fold 159 is removed by the cut 25 and how the paste 163 joins the resulting separate edges. Since the container to be made from the material shown in Figs. 13A and 14A is made up as already described, further illustration is not necessary. The requisite scoring, severing, pasting, folding, etc. features are as already described in the form of the invention shown in Fig. 13 and a further description in this respect will be unnecessary. The indexing for the lines of scoring, severance and cutting is the same.

Figure 13B:
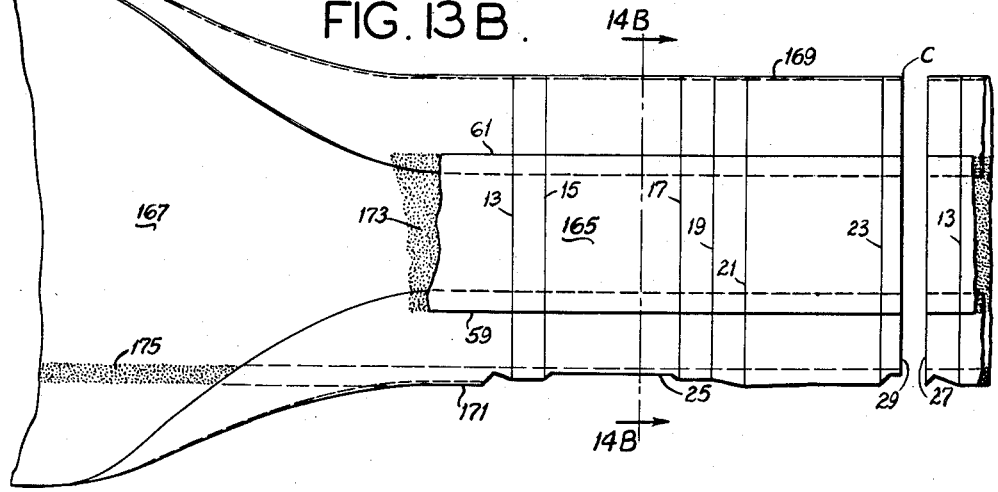
Fig. 13B is a view similar to Fig. 13, but showing a fifth form of the invention which is agin alternative to the third form shown in Fig. 13.
Figure 14B:
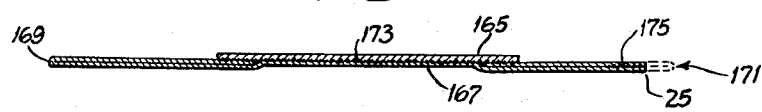
Fig. 14B is a cross section taken on line 14B—14B of Fig. 13B.

If desired, the width of the strip 47 may be increased and the arrangement shown at the top of Fig. 13 used at the bottom. This may be referred to as a fifth form of the invention and is shown in Figs. 13B and 14B. In this case the chip board strip is shown at 165 with a wider strip at 167, turned in and folded at 169 and 171 and attached to the strip 165 by adhesive 173. Because of the need for the cut 25, adhesive 175 is positioned within this fold 171, as indicated. Since the container to be made from the material shown in Figs. 13B and 14B is made up as already described, further illustration is not necessary. The requisite scoring, severing, cutting, pasting, folding, etc. features are as already described in the form of the invention shown in Fig. 13, and a further description will not be necessary. The indexing for the lines of scoring, severance and cutting is the same.

We refer next to a sixth form of the invention shown in Figs. 16–19, which so far as the outside of the resulting package is concerned, is like the form shown in Figs. 1–9. However, there is incorporated also an inner liner which in effect forms an inside bag attached to the outside carton-type bag already described. Referring then to said Figs. 16–19, there is shown at numeral 71 a chip board strip to which is attached a 30-pound paper strip 73 forming a printing surface. Attachment is by means of adhesive 75. Attached to the margins of this multi-ply strip 73, 75 are upper and lower 65-pound paper strips 77 and 79, respectively, attachment being by means of adhesive strips 81 and 83. The paste-applying rolls are shown at 85. Attached to the combination 71, 73, 77, 79 (on the side opposite 77 and 79) is a 65-pound layer of liner paper or plastic sheet 89, having a top marginal extension 91 and a bottom marginal extension 93. As shown in Fig. 17, spot pasting is employed for this purpose between sheets 71 and 89 and by paste 95 between margins of sheets 89 and 79. The extensions 79 and 93 are flush, as indicated at the pasting 95, whereas extension 91 extends beyond extension 77, as indicated at 97. Scoring, marginal cutting and segmentation are as already described and as indicated by the reference characters already used in this connection on other figures, these reference characters being applied to Figs. 16–19.

The composite strip is shown at S–6, and a segmented blank at B–6. Folding of the blank B–6 into tubular form, its bottoming and closure of its bottom are as already described, with the result shown in Figs. 18 and 19. The result is a carton-type bag having a 30-pound paper printing face 73 all around, with a multi-ply paper bottom 99, closed as shown at 101. The outer layer of this bottom is made by the extension 79 and the inner layer by the extension 93. The extension 93 is integral with the spot-pasted liner 89, the latter having the upper extension 91 adjacent which is the upper and shorter paper extension 77. The resulting partially closed package is shown in Fig. 18, wherein the spot-pasted and bottom-closed liner is shown as having been filled and pinched shut at the top ready for rolling in to close the liner, as indicated at 103 in Fig. 19. Then the extension 77 is rolled down and pasted shut to form an outside closure, as indicated at 105 in Fig. 19. The result is a carton-type bag having a chip board front, back and sides, with a folded, closed paper bottom and a folded, closed paper top, said bag having an inner spot-pasted and closed liner. It will be understood that the liner 89, including its extensions 93 and 91, may be composed of a material suitable for the packaged contents and may be plastic sheeting, waxed paper or the like.

Referring now to Figs. 20–23, there is shown a seventh form of the invention wherein each blank B–7 (Figs. 20 and 21) is constituted by a chip board blank 107, formed with a lower straight edge 109 and an upper edge 111, the latter being outlined to form side closure flaps 113 and a center closure flap 115. This blank has adhered to it a 30-pound paper facing 129. Marginally attached at 121 to the lower edge of the assembly of the chip board blank 107 and facing 129 is a 65-pound paper extension 123 for forming a bottom closure. Attached to the other side of the chip board blank 107 by spot pasting 117 is an inner liner 119 which may be composed of waxed paper, plastic sheet or the like. The liner 119, as shown at 125, extends to the end of the paper extension 123, where as shown at 127 they are marginally adhered to one another. At this margin they are also trimmed as shown at 131. It will be understood that this assembly may be produced from continuous strips of the liner 119, chip board blank 107, paper facing 129 and extension strip 123, as already described in the connection with other forms of the invention. Single-hinge scores are formed at 133 and 135, and double-hinge scores at 137, 139, 141 and 143. The scores 133 and 135 bisect the panels carrying the closure flaps 113. The double-hinge scores 137 and 139 are in alignment with bights 145 between these panels and the panel 115. The blank shown in Fig. 20 is made up into a package, as shown at 122, by adhering its margin adjacent the edge 147 to the margin adjacent the edge 149. The bottom closure is then made from the multi-ply extension 123, 125 in a manner which will by clear from the description already given in connection with the other forms of the invention. There will result a flat carton-type bag with inwardly directed gussets from which may be erected a carton such as shown in Fig. 22. The opened-out gussets are indicated at G–7. Assuming that the carton has been filled, the liner 119 is then closed in at the top independently of closure of the flaps 113 and 115. The top of this liner is rolled down as shown in Fig. 23, and then the flaps 113 and 115 may be closed in. The tab 151, hinged on score line 153, is positioned between the front of the package and the liner 119.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A flat gusseted bag adapted when opened to assume a carton-like form, said bag being formed from a generally rectangular blank having a relatively stiff intermediate band comprising a sheet of relatively stiff material such as cardboard and relatively flexible outer bands of material such as paper, said bands extending continuously from one side edge of the blank to the other, at least one of said outer bands being provided by a sheet of material such as paper which covers the outside of the intermediate band and which has a portion extending outward from one margin of the intermediate band and a portion doubled back upon said outwardly extending portion on the inside thereof, said doubled-back portion having its inner margin lapping and adhered to said one margin of the intermediate band, the blank being folded to have its said side edges overlapping, and said side edges being adhered together all along the overlap, including the overlapping portions of the side edges in the relatively stiff intermediate band and the overlapping portions of the side edges in the relatively flexible outer bands, thereby providing a tube having a relatively stiff intermediate section and relatively flexible end sections, the tube having scores extending continuously from one of its ends to the other establishing gusset sides and front and back walls, the tube being flat when the gusset sides are infolded, one end section being folded and pasted to provide a bottom closure adapted to lie flat with the flat tube and being sufficiently flexible to assume the form of a substantially flat bottom closure in a plane normal to the front and back walls when the gusset sides are angled out into substantially flat planes normal to the front and back walls, the other end section providing a flexible top for the tube which lies flat with the flat tube and which is sufficiently flexible to be closed and to assume the form of a substantially flat top closure when the sides are angled out into said flat planes and the container has been filled.

2. A flat gusseted bag adapted when opened to assume a carton-like form, said bag being formed from a generally rectangular blank having a relatively stiff intermediate band comprising a sheet of relatively stiff material such as cardboard and relatively flexible outer bands of material such as paper, said bands extending continuously from one side edge of the blank to the other, one of said outer bands being provided by a sheet of material such as paper which covers the outside of the intermediate band and which has a portion extending outward from one margin of the intermediate band and a portion doubled back upon said outwardly extending portion on the inside thereof, said doubled-back portion having its inner margin lapping and adhered to said one margin of the intermediate band, the other of said outer bands being provided by an undoubled strip of material such as paper adhered to the other margin of the intermediate band, the blank being folded to have its said side edges overlapping, and said side edges being adhered together all along the overlap, including the overlapping portions of the side edges in the relatively stiff intermediate band and the overlapping portions of the side edges in the relatively flexible outer bands, thereby providing a tube having a relatively stiff intermediate section and relatively flexible end sections, the tube having scores extending continuously from one of its ends to the other establishing gusset sides and front and back walls, the tube being flat when the gusset sides are infolded, one end section being folded and pasted to provide a bottom closure adapted to lie flat with the flat tube and being sufficiently flexible to assume the form of a substantially flat bottom closure in a plane normal to the front and back walls when the gusset sides are angled out into substantially flat planes normal to the front and back walls, the other end section providing a flexible top for the tube which lies flat with the flat tube and which is sufficiently flexible to be closed and to assume the form of a substantially flat top closure when the sides are angled out into said flat planes and the container has been filled.

3. A bag as set forth in claim 2 wherein the undoubled outer band constitutes the end section which is folded and pasted to provide the bottom closure.

4. A bag as set forth in claim 2 wherein the doubled outer band constitutes the end section which is folded and pasted to provide the bottom closure.

5. A flat gusseted bag adapted when opened to assume a carton-like form, said bag being formed from a generally rectangular blank having a relatively stiff intermediate band comprising a sheet of relatively stiff material such as cardboard and relatively flexible outer bands of material such as paper, said bands extending continuously from one side edge of the blank to the other, said outer bands being constituted by integral portions of a sheet of material such as paper wider than the sheet of stiff material and which is adhered to the outside of the sheet of stiff material and which has doubled-back portions outward of the sheet of stiff material, said doubled-back portions having their inner margins lapping and adhered to the margins of the sheet of stiff material, the blank being folded to have its said side edges overlapping, and said side edges being adhered together all along the overlap, including the overlapping portions of the side edges in the relatively stiff intermediate band and the overlapping portions of the side edges in the relatively flexible outer bands, thereby providing a tube having a relatively stiff intermediate section and relatively flexible end sections, the tube having scores extending continuously from one of its ends to the other establishing gusset sides and front and back walls, the tube being flat when the gusset sides are infolded, one end section being folded and pasted to provide a bottom closure adapted to lie flat with the flat tube and being sufficiently flexible to assume the form of a substantially flat bottom closure in a plane normal to the front and back walls when the gusset sides are angled out into substantially flat planes normal to the front and back walls, the other end section providing a flexible top for the tube which lies flat with the flat tube and which is sufficiently flexible to be closed and to assume the form of a substantially flat top closure when the sides are angled out into said flat planes and the container has been filled.

References Cited in the file of this patent

UNITED STATES PATENTS

| Number | Name | Date |
|---|---|---|
| 147,547 | Beecher | Feb. 17, 1874 |
| 1,135,878 | Christensen | Apr. 13, 1915 |
| 1,486,234 | Dickey | Mar. 11, 1924 |
| 1,749,005 | Taylor | Mar. 4, 1930 |
| 1,988,691 | Lovett | Jan. 22, 1935 |
| 1,991,450 | Doble | Feb. 19, 1935 |
| 2,053,116 | Sperry | Sept. 1, 1936 |
| 2,143,957 | Petter | Jan. 17, 1939 |
| 2,232,260 | Nebel | Feb. 18, 1941 |
| 2,241,459 | Howard | May 13, 1941 |
| 2,330,255 | Ames | Sept. 28, 1943 |
| 2,335,019 | Mullinix | Nov. 23, 1943 |
| 2,342,324 | Allen | Feb. 22, 1944 |
| 2,556,321 | Denton | June 12, 1951 |

FOREIGN PATENTS

| Number | Country | Date |
|---|---|---|
| 375,058 | Great Britain | June 23, 1932 |
| 627,711 | Great Britain | Aug. 15, 1949 |